(12) United States Patent
Mihara et al.

(10) Patent No.: US 10,011,487 B2
(45) Date of Patent: Jul. 3, 2018

(54) POROUS CARBON MATERIAL, PRECURSOR FOR POROUS CARBON MATERIAL, PROCESS FOR PRODUCING PRECURSOR FOR POROUS CARBON MATERIAL, AND PROCESS FOR PRODUCING POROUS CARBON MATERIAL

(71) Applicant: Toray Industries, Inc., Chuo-ku, Tokyo (JP)

(72) Inventors: Takaaki Mihara, Otsu (JP); Kentaro Tanaka, Otsu (JP); Kosaku Takeuchi, Otsu (JP); Tomoyuki Horiguchi, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 9 days.

(21) Appl. No.: 14/778,789

(22) PCT Filed: Mar. 11, 2014

(86) PCT No.: PCT/JP2014/056278
§ 371 (c)(1),
(2) Date: Sep. 21, 2015

(87) PCT Pub. No.: WO2014/148303
PCT Pub. Date: Sep. 25, 2014

(65) Prior Publication Data
US 2016/0046491 A1    Feb. 18, 2016

(30) Foreign Application Priority Data

Mar. 22, 2013  (JP) .................................. 2013-059845

(51) Int. Cl.
*C01B 31/02* (2006.01)
*C01B 31/00* (2006.01)

(52) U.S. Cl.
CPC .............. *C01B 31/02* (2013.01); *C01B 31/00* (2013.01)

(58) Field of Classification Search
CPC ....................................................... C01B 31/02
See application file for complete search history.

(56) References Cited

U.S. PATENT DOCUMENTS

| 2007/0059233 | A1 | 3/2007 | Sheem |
| 2013/0184145 | A1 | 7/2013 | Takahashi et al. |
| 2015/0258487 | A1* | 9/2015 | Hornbostel ........... F17C 11/005 |
| | | | 206/0.7 |

FOREIGN PATENT DOCUMENTS

| CN | 101844070 B | * 12/2013 |
| EP | 2407423 | 1/2012 |

(Continued)

OTHER PUBLICATIONS

Translation of CN 101844070, Cheng et al., Dec. 11, 2013, p. 1-6.*

(Continued)

*Primary Examiner* — Hai Vo
(74) *Attorney, Agent, or Firm* — RatnerPrestia

(57) ABSTRACT

The present invention provides: a porous carbon material which includes a portion having a continuous porous structure and a portion having no continuous porous structure and has even pore size and matrix size in the material center part thereof, thereby being easy to composite with other materials and being able to be used in various applications; a porous-carbon-material precursor; a process for producing the porous-carbon-material precursor; and a process for producing the porous carbon material. A porous carbon material of the invention is a porous carbon material which includes a portion having a continuous porous structure and a portion having substantially no continuous porous struc- (Continued)

ture, in which the portion having the continuous porous structure has a structural period of 0.002 to 1 μm.

6 Claims, 3 Drawing Sheets

(56) References Cited

FOREIGN PATENT DOCUMENTS

| JP | 02160923 | 6/1990 |
|----|----------|--------|
| JP | 02160924 | 6/1990 |
| JP | 2003336130 | 11/2003 |
| JP | 2004259593 | 9/2004 |
| JP | 2006240902 | 9/2006 |
| JP | 2006328340 A | 12/2006 |
| WO | 2012043347 A1 | 4/2012 |
| WO | 2012131628 | 10/2012 |

OTHER PUBLICATIONS

Extended European Seach Report for European Application No. 14768065.6, dated Aug. 8, 2016, 9 pages.

Saudi Arabia Examination Report for Saudi Arabia Application No. 515361217, dated Oct. 26, 2016, including English translation, 11 pages.

Chinese Office Action with English language translation for Application No. 201480016825.0, dated Jan. 10, 2017, 18 pages.

International Search Report for International Application No. PCT/JP2014/056278 dated May 13, 2014.

European Communication for European Application No. 14 768 065.6, dated Jan. 22, 2018, 5 pages.

Cheremskoi, P.G., "Methods of research of the porosity of solid bodies", Moscow, Energoatomizdat, 1985, pp. 62-87.

Abrasimova, G.E., "Evolution of the structure of amorphous alloys", UFN, 2011, vol. 181, pp. 1265-1281.

Smorgonskaya, E.A,. "The physics of the solid body", 2002, vol. 44, Publ. 10, pp. 1908-1914.

Alexensky, A.E., "The physics of solid body", 1999, vol. 41, Publ. 4, pp. 740-743.

Parfenjeva, L.S., "The physics of solid body", 2008, vol. 50, Publ. 12, pp. 2150-2159.

Eurasian Office Action for Eurasian Application No. 201591549, dated Feb. 9, 2018, including English translation, 5 pages.

Korean Office Action for Korean Application No. 10-2015-7025600, dated Apr. 23, 2018, including English language translation, 9 pages.

\* cited by examiner

US 10,011,487 B2

POROUS CARBON MATERIAL, PRECURSOR FOR POROUS CARBON MATERIAL, PROCESS FOR PRODUCING PRECURSOR FOR POROUS CARBON MATERIAL, AND PROCESS FOR PRODUCING POROUS CARBON MATERIAL

CROSS-REFERENCE TO RELATED APPLICATIONS

This is the U.S. National Phase application of PCT International Application No. PCT/JP2014/056278, filed Mar. 11, 2014, and claims priority to Japanese Patent Application No. 2013-059845, filed Mar. 22, 2013, the disclosures of each of these applications being incorporated herein by reference in their entireties for all purposes.

FIELD OF THE INVENTION

The present invention relates to a porous carbon material which can be used in various applications, a porous-carbon-material precursor, a process for producing the porous-carbon-material precursor, and a process for producing the porous carbon material.

BACKGROUND OF THE INVENTION

As porous carbon materials, activated carbons having both macropores which are relatively large pores and micropores, such as particulate activated carbons and activated-carbon fibers; and fine carbons represented by carbon nanotubes and meso-porous carbons produced from a meso-porous silica or zeolite template, are known.

Of these, the activated carbons are in use as adsorbent materials and catalyst supports mainly in the field of industrial materials so as to take advantage of the large specific surface area thereof. In particular, since pores are formed by activating a bulk material which has been carbonized beforehand, the activated carbons further have an advantage in that porous materials can be supplied at relatively low cost. However, in general activation processes, pores are formed unidirectionally from the surface of the carbon material toward the inner part thereof and, hence, it is difficult to produce a material having communicating pores which are pores that communicate with one another. There has hence been a problem concerning application to composite materials, for example, because it is difficult to highly fill another material into the pores.

Patent Document 1 describes a technique for obtaining porous carbon fibers by mixing a carbonizable material with an eliminable material. However, the carbonizable material and the eliminable material are a combination which forms a non-compatible system, and the mere addition of a compatibilizing agent was unable to form continuous pores.

Patent Document 2 describes a technique in which the porous carbon fibers described in Patent Document 1 are further activated to form pores therein, thereby producing activated-carbon fibers. However, since the activation step is intended to form pores from the surface of the carbon material mainly by oxidation as stated above, this technique also failed to form continuous pores.

Patent Documents 3 and 4 show examples in which a carbon material which itself has a continuous porous structure introduced thereto is produced by mixing a thermosetting resin with a thermoplastic resin, curing the thermosetting resin, subsequently removing the thermoplastic resin, and then performing carbonization.

PATENT DOCUMENT

Patent Document 1: JP-A-2-160923
Patent Document 2: JP-A-2-160924
Patent Document 3: JP-A-2004-259593
Patent Document 4: JP-A-2006-240902

SUMMARY OF THE INVENTION

The present invention provides a porous carbon material which simultaneously includes a portion having continuous pores and a portion having no continuous pores and which, due to this configuration, is excellent in electrical conductivity, thermal conductivity, pressure resistance, and strength for withstanding tension or compression.

A first embodiment of the present invention is a porous carbon material which includes a portion having a continuous porous structure and a portion having substantially no continuous porous structure, in which the portion having the continuous porous structure has a structural period of 0.002 to 1 μm.

A second embodiment of the present invention is a porous-carbon-material precursor which includes a portion having a continuous porous structure and a portion having substantially no continuous porous structure, in which the portion having the continuous porous structure has a structural period of 0.003 to 2 μm.

A third embodiment of the present invention is a porous-carbon-material precursor including a portion where a carbonizable resin and an eliminable resin each form a continuous phase and a portion that is substantially constituted only of a carbonizable resin, in which the portion where the carbonizable resin and the eliminable resin each form the continuous phase has a structural period of 0.003 to 2 μm.

A fourth embodiment of the present invention is a process for producing a porous-carbon-material precursor, the process including:
  step 1: a step in which 10 to 90% by weight of a carbonizable resin and 90 to 10% by weight of an eliminable resin are brought into a compatibly mixed state to obtain a resin mixture; and
  step 2: a step in which the resin mixture obtained in the step 1 is caused to undergo phase separation and the separated phases are fixed.

A fifth embodiment of the present invention is a process for producing a porous carbon material, the process including:
  step 1: a step in which 10 to 90% by weight of a carbonizable resin and 90 to 10% by weight of an eliminable resin are brought into a compatibly mixed state to obtain a resin mixture;
  step 2: a step in which the resin mixture obtained in the step 1 is caused to undergo phase separation and the separated phases are fixed to obtain a porous-carbon-material precursor; and
  step 3: a step in which the porous-carbon-material precursor obtained in the step 2 is carbonized by pyrolysis.

According to the invention, due to the portion having the continuous porous structure, it is possible to impart a function by filling and/or passing a fluid into or through the pores which constitute the continuous porous structure. Furthermore, since branches are continued, the electrical conductivity and the thermal conductivity are heightened to some degree. In addition, an effect in which the branches support one another to maintain the structure is produced, and due to this effect, the material has some degree of resistance to deformations such as ones caused by tension or compression. Since the material of the present invention not only has the portion having the continuous porous structure but also includes a portion having substantially no continuous porous structure, the electrical conductivity and thermal conductivity are further heightened and it is possible to remarkably enhance the resistance to deformations caused by tension, compression, etc., in particular, resistance to compressive rupture. Especially in the case where the material has a configuration in which the portion having no continuous porous structure covers the portion having the continuous porous structure, it is possible to more efficiently and easily impart a function by filling and/or passing a fluid into or through the pores which constitute the continuous porous structure.

DETAILED DESCRIPTION OF EMBODIMENTS OF THE INVENTION

<Porous Carbon Material>

The porous carbon material (hereinafter sometimes referred to simply as "material") of embodiments of the invention includes a portion having a continuous porous structure and a portion having substantially no continuous porous structure.

Figure 1:
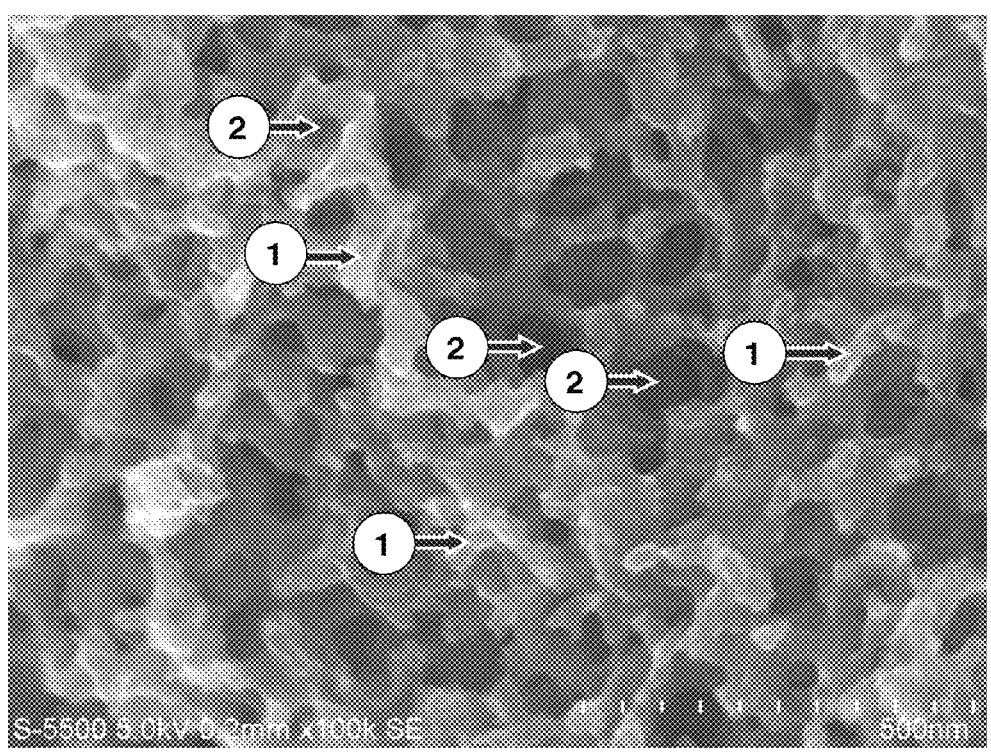
FIG. 1 is a scanning electron photomicrograph of the porous carbon material of Example 1.

The term "continuous porous structure" in the porous carbon material of the invention means that when a specimen of the porous carbon material which has been sufficiently cooled, for example, in liquid nitrogen is cut with tweezers or the like and the cut surface is examined with a scanning electron microscope (SEM) or the like, then a structure in which branches (carbon part) 1 and pores (voids) 2 are respectively continued inward is observed, specifically as shown in FIG. 1 that is a scanning electron photomicrograph of the porous carbon material of Example 1.

The portion having the continuous porous structure in the porous carbon material of the invention can be made to exhibit the fractionating properties such as separation, adsorption, or elimination, by filling and/or passing a fluid into or through the pores which constitute the continuous porous structure, or can be made to have functions required for battery materials by using an electrolytic solution. Furthermore, since the continued branches bring about increased electrical conductivity and thermal conductivity, not only the porous carbon material can be provided as a battery material having low resistance and low loss, but also the high thermal conductivity enables the heat generated inside the continuous porous structure to be rapidly transferred to the outside and makes it possible to maintain high evenness in temperature. In addition, due to the effect in which the branches support one another to maintain the structure, this material has high resistance to deformations such as ones caused by tension, compression, etc.

Meanwhile, the term "portion having substantially no continuous porous structure" means that when a cross-section formed by the cross-section polisher method (CP method) is examined at a magnification resulting in 1±0.1 (nm/pixel), then a portion in which any pores have a size less than the resolution and hence no distinct pores are observed is present over an area that is not less than the region of a square in which each side corresponds to three times the structural period L calculated from X-ray analysis as will be described later.

Since there is the portion having substantially no continuous porous structure, the carbon is densely packed and the electrical conductivity is hence enhanced. Consequently, the electrical conductivity and the thermal conductivity can be maintained on or above a certain level. Because of this, in the case where the porous carbon material is used, for example, as a battery material, it is possible to rapidly discharge the heat of reaction from the system and to keep the resistance to electron transfer low. Consequently, a contribution to the production of high-efficiency batteries can be attained. In addition, due to the presence of the portion having no continuous porous structure, it is possible to remarkably heighten the resistance to, in particular, compressive rupture.

Especially in the case where the porous carbon material has a configuration in which the portion having no continuous porous structure covers the portion having the continuous porous structure, it is possible to more efficiently fill and/or pass a fluid into or through the pores which constitute the continuous porous structure. It is also possible to use this porous carbon material as a functional material in which the portion having the continuous porous structure serves as a channel and the portion having no continuous porous structure serves as a functional portion. Specifically, by using as a channel the portion having the continuous porous structure and passing a gas or a liquid therethrough to conduct filtration with the portion having no continuous porous structure, functional substances can be separated.

Meanwhile, the portion having the continuous porous structure in the porous carbon material of the invention preferably has a narrow structure size distribution. This porous carbon material is hence suitable also as a column material for HPLC to provide a column having a high degree of fractionating properties. Furthermore, fixing a catalyst to the surface of the portion having the continuous porous structure can contribute to application of the porous carbon material to microreactors, exhaust gas purification catalysts, and the like in which the portion having no continuous porous structure serves to control.

The proportion of the portion having no continuous porous structure is not particularly limited, and can be regulated arbitrarily in accordance with applications. However, in the case where the porous carbon material is used as a fractionating material in which the portion having no continuous porous structure serves as a wall surface or in the case where the porous carbon material is used as a battery material, it is preferable in either case that the portion having no continuous porous structure accounts for 5% by volume or more. This is because this configuration can prevent the fluid from leaking out from the continuous porous structure of the invention, while maintaining the fractionating properties, or makes it possible to maintain electrical conductivity and thermal conductivity on a high level.

It is important that the portion having the continuous porous structure in the porous carbon material, according to one embodiment of the invention, should have a structural period of 0.002 to 1 μm. The structural period of the portion having the continuous porous structure in the porous carbon material of the invention is determined by irradiating a specimen of the porous carbon material of the invention with X-rays and calculating the structural period from the scattering angle θ corresponding to the position where the scattered-light intensity has a peak value, using the following equation.

$$L = \frac{\lambda}{2\sin\theta}$$ [Math. 1]

Structural period: L
λ: wavelength of incident X-rays

In the case where the structural period thereof is in the range of 0.002 to 1 μm, not only a fluid can be filled and/or passed into or through the continuous porous structure, but also it is possible to ensure electrical conductivity and thermal conductivity through the branches. In addition, this continuous porous structure can be even, rendering the porous carbon material usable as an ideal fractionating material. When the material is analyzed for structural period with X-rays, the portion having no continuous porous structure exerts no influence on the analysis because the structural period thereof is outside the range, and the structural period calculated with the above-mentioned equation is taken as the structural period of the portion having the continuous porous structure.

The shorter the structural period, the finer the structure and the larger the surface area per unit volume or unit weight. Shorter structural periods are hence preferred, for example, in the case where a catalyst is fixed, because the efficiency of contact between the catalyst and a fluid is remarkably heightened. Meanwhile, the longer the structural period, the more the pressure loss can be reduced and the more a fluid can be filled and/or passed. Longer structural periods are hence preferred. It is hence preferable that the structural period should be set arbitrarily in accordance with the application in which the porous carbon material is to be used.

It is preferable in the porous carbon material (hereinafter sometimes referred to simply as "material") of the invention that the portion having the continuous porous structure forms a core layer and the portion having substantially no continuous porous structure forms a skin layer.

[Core Layer]

The core layer is a layer which has a continuous porous structure. In the case where the porous carbon material has such a structure, it is easy to immerse another material into the continuous porous structure from a cross-section of the material which is, for example, in the form of a fiber or a film. In addition, this material can be utilized as a path for causing substances to pass therethrough. It is therefore possible to utilize this material as the channel of a column for separation or as the gas channel of a gas separation membrane.

Furthermore, since the continuous porous structure according to the invention is preferably an isotropic structure which is not aligned in a specific direction, this porous carbon material is excellent in mechanical property regarding compression, bending, tension, etc., and the structure contributes to improvement in the brittleness which is characteristic of carbonized materials.

It is preferable that the continuous porous structure of the core layer is formed so that a central part thereof has a structural period of 0.002 to 1 μm. The term "central part" herein means the gravity center on the assumption that the mass distribution in the cross-section of the porous carbon material is even. In the case of a powder particle, for example, the gravity center thereof is the central part. In the case where the material is in the form of a fiber which has a round cross-section, the "central part" indicates a point where the distances from the fiber surface are the same in a cross-section of the fiber perpendicular to the fiber axis. However, in the case of a film shape in which it is difficult to clearly define the gravity center thereof, the "central part" thereof is defined as follows. Namely, a vertical line is drawn from the film surface in the cross-section perpendicular to TD or MD direction. Then, an aggregate of points which are placed at one-half of the film thickness on the vertical line is defined as the "central part". Similarly, in the case of a hollow fiber in which the gravity center thereof is not within the material, the "central part" thereof is defined as follows. Namely, a vertical line is drawn from the tangent line of the outer surface of the hollow fiber. Then an aggregate of points which are placed at one-half of the material thickness on the vertical line is defined as the "central part".

The structural period is determined through an examination with a scanning electron microscope in the following manner. At a magnification which has been set so that the dimension of each side is 10 to 100 times the structural period, image data having a resolution of 700,000 pixels or higher are acquired. The image data acquired are trimmed so as to result in a square region in which each side has 512 pixels, and then subjected to two-dimensional Fourier transformation and to processing by circular averaging, thereby obtaining a one-dimensional spectrum. The characteristic wavelength corresponding to the position of a peak in the resultant curve is determined, and the structural period is determined from the inverse of the wavelength. The structural period of the central part is the structural period determined when the analysis is conducted so that the central part of the material lies at the center of the trimmed region.

So long as the material has a structural period of 0.002 μM or longer, this material not only can be easily composited with other materials but also can exhibit excellent separation properties when used, for example, as a separation column material. This embodiment is hence preferred. Meanwhile, so long as the material has a structural period of 1 μm or shorter, this material as a structure has few defects and can be a mechanically excellent material. A value of structural period can be selected within the above-mentioned range arbitrarily in accordance with applications.

It is preferable that the continuous porous structure of the core layer is one in which the central part thereof has an average porosity of 10 to 80%. The term "average porosity" means a porosity determined by obtaining a precise cross-section of an embedded specimen by the cross-section polisher method (CP method), examining the cross-section at a magnification regulated so as to result in 1±0.1 (nm/pixel) and at a resolution of 700,000 pixels or higher, setting in the resultant image a square examination region for calculation in which each side has 512 pixels, and calculating the average porosity using the following equation, in which A is the area of the examination region and B is the area of the pores.

Average porosity (%)=$B/A$×100

The higher the average porosity thereof, the more the efficiency of filling can be heightened when the material is composited with other materials and the lower the pressure loss and the more the flow velocity can be heightened when the core layer is used as a channel for gases or liquids. Meanwhile, the lower the average porosity thereof, the higher the resistance to forces applied in cross-sectional directions, such as compression and bending, and hence the more the material is advantageous in terms of handleability and use under pressure. In view of these, the average porosity of the central part of the porous carbon material of the invention is preferably in the range of 15 to 75%, more preferably in the range of 18 to 70%.

It is preferable that the continuous porous structure of the core layer has at least one peak diameter in the range of 5 to 400 nm in a pore diameter distribution curve thereof. The pore diameter distribution is determined by the mercury intrusion method or the gas adsorption method. The mercury intrusion method is suitable for acquiring the pore diameter distributions of materials having a long structural period because pore diameter distribution curves in a wide range of 5 nm to 500 µm can be acquired therewith. In contrast, the gas adsorption method is suitable for acquiring pore diameter distributions in a range of up to about 100 nm, which is small as compared with that in the mercury intrusion method. For determining a pore diameter distribution, either the mercury intrusion method or the gas adsorption method can be suitably selected in accordance with the structural period of the porous carbon material of the invention. The smaller the value of the peak diameter in the pore diameter distribution curve, the shorter the distance between the porous carbon material and the material of another kind composited therewith. Especially in the range of up to about tens of nanometers, it is easy to form a state in which a current is apt to flow between the material of another kind and the porous carbon material of the invention, because of the quantum tunnel effect. Meanwhile, the larger the value thereof, the easier the compositing with particles having a large diameter, etc. In view of these, the peak diameter in the pore diameter distribution curve of the porous carbon material of the invention is more preferably in the range of 5 to 350 nm, even more preferably in the range of 5 to 300 nm.

Incidentally, since the skin layer, which will be described below, has substantially no pores, the pore diameter distribution of the core layer can be determined by determining the pore diameter distribution of the whole material. The pore diameter distribution curve of the core layer can be approximated by the pore diameter distribution curve of the whole material.

[Skin Layer]

The term "skin layer" means the layer which is formed around the core layer and has substantially no continuous porous structure. The expression "has substantially no continuous porous structure" means that when a cross-section formed by the cross-section polisher method (CP method) is examined at a magnification resulting in 1±0.1 (nm/pixel), then a portion in which any pores have a size less than the resolution and hence no distinct pores are observed is present over an area that is not less than the region of a square in which each side corresponds to three times the structural period L calculated through an examination with a scanning electron microscope.

The thickness of the skin layer is not particularly limited, and can be suitably selected in accordance with applications of the material. However, in case where the skin layer is too thick, this porous carbon material tends to have a reduced porosity. Consequently, the thickness thereof is preferably 100 µm or less, more preferably 50 µm or less, most preferably 20 µm or less. Although there is no particular lower limit thereon, the thickness of the skin layer is preferably 1 nm or larger from the standpoints of maintaining the shape of the material and making the skin layer exhibit a function different from that of the core layer.

As described above, it is preferable that the porous carbon material of the invention has an asymmetrical structure including a core layer and a skin layer. This is a preferred embodiment because in cases when the porous carbon material having such an asymmetrical structure is composited with another material to obtain a composite material, it is possible to produce a composite material in which the skin layer part has not been filled with the material of another kind and the continuous porous structure of the core layer only has been filled with the material of another kind. Such a composite material can be configured so that the skin layer part exhibits the properties possessed by the carbon material itself, such as chemical stability and thermal and electrical conductivity, and that various functional materials are fixed to the core layer, and is thought to be used in a wide range of applications including battery materials, catalyst supports, and fiber-reinforced composite materials. Furthermore, since this porous carbon material has an asymmetrical structure including a skin layer and a core layer, efficient filtration and separation is rendered possible when the porous carbon material is used, for example, in separation membrane applications by using the skin layer as a separation functional layer and the core layer as a channel for fluids. That embodiment is hence preferred.

[Shape of the Porous Carbon Material]

The shape of the porous carbon material of the invention is not particularly limited, and examples thereof include a bulk shape, rod shape, flat plate shape, disk shape, and spherical shape. However, in preferred embodiments, the porous carbon material is in the form of a fiber, film, or powder among those.

The term "in the form of a fiber" means a shape in which the average length is at least 100 times the average diameter. The material may be filaments or long fibers, or may be staples, short fibers, or chopped strands. The shape of the cross-section thereof is not limited at all, and the cross-section can have any shape such as a round cross-section, a multi-leafed cross-section, e.g., triangular cross-section, a flat cross-section, or a hollow cross-section.

In the case where the material is in the form of a fiber, it is possible to fill and/or pass a fluid into or through the portion having the continuous porous structure. Especially in the case where an electrolytic solution is passed, efficient electrochemical reactions can be induced in the continuous porous structure. The material is hence a preferred embodiment. In cases when a fluid is filled and/or passed at a high pressure, this material shows high compressive resistance because the material has such a structure that the branches which constitute the portion having the continuous porous structure support one another, making it possible to efficiently fill and/or pass the fluid.

Moreover, in the case where a fluid which is a mixture is filled and/or passed, adsorption and desorption occur on the surface which constitutes the continuous porous structure. This material as a fractionating column material shows excellent fractionating properties and is hence a preferred embodiment. Furthermore, due to the presence of the portion having no continuous porous structure, the material can combine electrical conductivity and thermal conductivity, making it easy to remove the heat of reaction which accompanies the electrochemical reactions. In addition, when this material is used as a fractionating column material, the deformation which may be caused by pressurization due to the pressure loss of the fluid can be minimized and the fractionating column material can show stable performance.

In the case where the material is in the form of a fiber which includes a core layer and a skin layer and where this material is used, for example, as a separation membrane for fluids, the fibers themselves can be fabricated into a module. This configuration has advantages, for example, in that it is easy to pass a fluid through the voids of the core layers to cause the material to perform a separating function at the interface between the core layer and the skin layer, and that it is possible to attain a larger membrane area per unit volume as compared with flat membranes. In addition, since this material has enhanced resistance to forces applied in cross-sectional directions, the module can be operated also at high pressures, rendering high-efficiency membrane separation possible. This configuration is hence preferred. Moreover, a module including the material is suitable also for use as a column for separation in high-performance liquid chromatograph or the like. In the case where the porous carbon material of the invention is in the form of a fiber including a core layer and a skin layer, the structural evenness is high and the specific surface area is large because an even continuous porous structure is formed in the core layer. Because of this, the mixture-separating performance can be remarkably heightened without heightening the pressure loss which is a burden to the operation. This embodiment is hence preferred.

In the case where the material is used in the form of short fibers, it is easy to composite this material by melt-kneading the material together with a resin serving as a matrix thereby immersing the matrix resin into the voids of the portion having the continuous porous structure. In the case where the porous carbon material of the invention which is in such a form is used, the material has a larger area contacting with the matrix as compared with general short carbon fibers, making it possible to easily improve the mechanical properties to attain high strength and high elastic modulus.

In particular, in the case where the material has a hollow cross-section, another material can be filled into the hollow and, hence, this material is rendered applicable, for example, to battery materials and the like by filling an electrolytic solution or an active material. In addition, this material can be used as a hollow-fiber membrane for separating substances. The shape of the hollow is not particularly limited, and the hollow can have any shape such as a round cross-section, a multi-leafed cross-section, e.g., triangular cross-section, a flat cross-section, or a shape having a plurality of hollows.

The average diameter of the fibers is not particularly limited, and can be determined arbitrarily in accordance with applications. However, the average diameter thereof is preferably 10 nm or larger from the standpoint of maintaining the handleability and porousness. From the standpoint of ensuring flexural rigidity to improve the handleability, the average diameter thereof is preferably 5,000 µm or less.

In the case where the porous carbon material is in the form of a film, the portion having a continuous porous structure can be composited with another material and the resultant composite as such can be used as a sheet. This porous carbon material is hence suitable for use in applications such as electrodes among battery materials and electromagnetic shielding materials. Especially in the case where this material has a core layer and a skin layer, the skin layer can retain electrical conductivity and thermal conductivity on a high level and functions as an interface which is suitable, for example, for adhesion to other materials. This embodiment is hence preferred. In cases when this material has a configuration in which the skin layer is formed only on one surface of the film, it is easy to composite the core layer, which is the portion having the continuous porous structure, with another material. This material is hence a preferred embodiment.

The thickness of the film is not particularly limited, and can be determined arbitrarily in accordance with applications. However, the thickness thereof is preferably 10 nm or larger when handleability is taken into account, and is preferably 5,000 µm or less from the standpoint of preventing damages due to flexing.

In the case where the porous carbon material is in the form of a powder, this material can be applied, for example, to battery materials, etc. The portion having no continuous porous structure accounts for some of each of the particles constituting the powder, i.e., some of each particle. Because of this, not only the electrical conductivity and thermal conductivity within the particle can be remarkably heightened, but also the compressive strength of the particle itself can be heightened, thereby inhibiting a performance deterioration from occurring at high pressures. This material is hence preferred. In addition, due to the configuration in which the portion having no continuous porous structure accounts for some of each of the particles which constitute the powder, not only the electrical conductivity and thermal conductivity can be heightened but also the portions having no continuous porous structure of the respective particles come into contact with one another, thereby making it possible to further heighten the electrical conductivity and thermal conductivity. This material is hence preferred. Furthermore, in such cases when the portion having no continuous porous structure accounts for some of each of the particles which constitute the powder, a fluid that is being caused to flow through the powder passes along the portions having no continuous porous structure. As a result, the channels are complicated, and the fluid can be efficiently mixed. The portions having no continuous porous structure can thus impart properties which render the porous carbon material suitable for use as a separation column packing material. This material is hence a preferred embodiment.

It is preferable that the proportion of the portion having no continuous porous structure is 5% by volume or higher from the standpoint of enabling the material to exhibit those properties. The proportion of the portion having no continuous porous structure can be determined by conventionally known analytical techniques. In a preferred method, however, the three-dimensional shape of each particle is determined by electron-beam tomography, X-ray micro-CT, or the like and that proportion is calculated from the volume of the portion having the continuous porous structure and that of the portion having no continuous porous structure.

In the case where the porous carbon material is in the form of a powder and each of the particles constituting the powder includes a core layer and a skin layer, this material can be used as a lightweight filler of hollow particles. This material is hence a preferred embodiment.

The particle size of the powder is not particularly limited, and can be suitably selected in accordance with applications. However, a preferred range thereof is 10 nm to 10 mm, because the material having such a particle size can be handled as a powder. In particular, the powder having a particle size of 10 µm or less, when used, for example, as a solid ingredient for constituting a paste, gives an exceedingly smooth paste and, hence, this paste can be prevented from causing defects such as paste peeling or cracking in steps of application or the like. Meanwhile, the powder having a particle size of 0.1 µm or larger, when used for producing composite materials with resins, can sufficiently exhibit as a filler the effect of improving strength. This material is hence a preferred embodiment.

<Porous-Carbon-Material Precursor>

The porous-carbon-material precursor of embodiments of the invention includes a porous-carbon-material precursor having pores and a porous-carbon-material precursor having no pores. The porous-carbon-material precursor having pores has a portion having a continuous porous structure and a portion having substantially no continuous porous structure, and the portion having the continuous porous structure has a structural period of 0.003 to 2 μm. Meanwhile, the porous-carbon-material precursor having no pores has a portion where a carbonizable resin and an eliminable resin each form a continuous phase and a portion that is substantially constituted only of a carbonizable resin, in which the portion where the carbonizable resin and the eliminable resin each form a continuous phase has a structural period of 0.003 to 2 μm.

Figure 2:
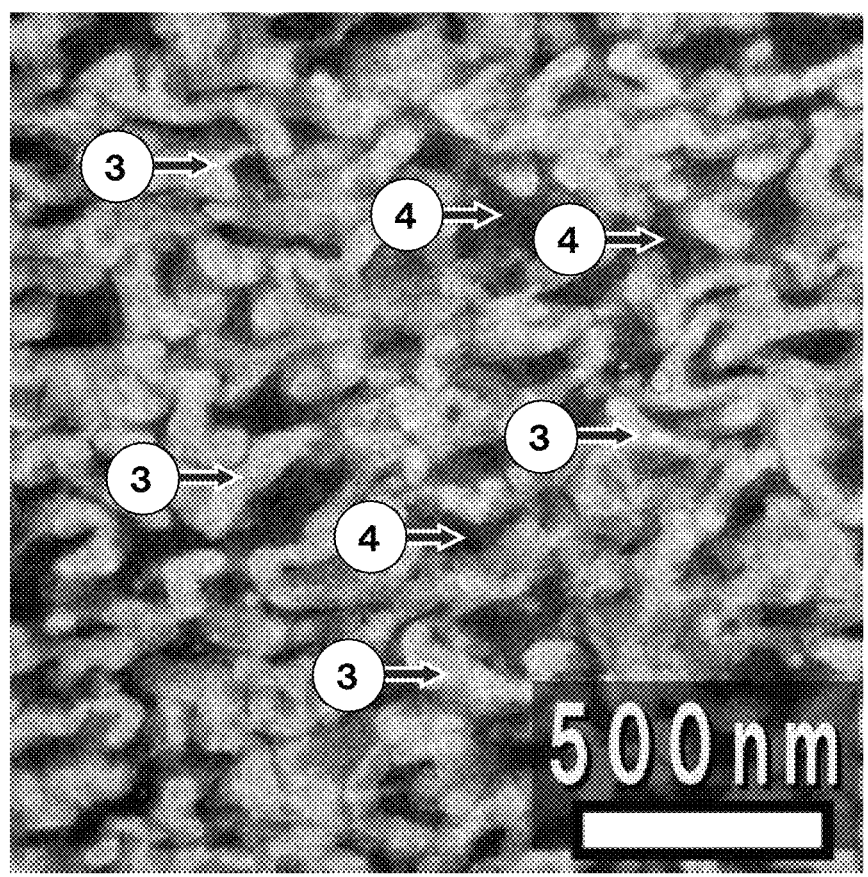
FIG. 2 is a transmission electron photomicrograph of the porous-carbon-material precursor of Example 9, which has no pores.
Figure 3:
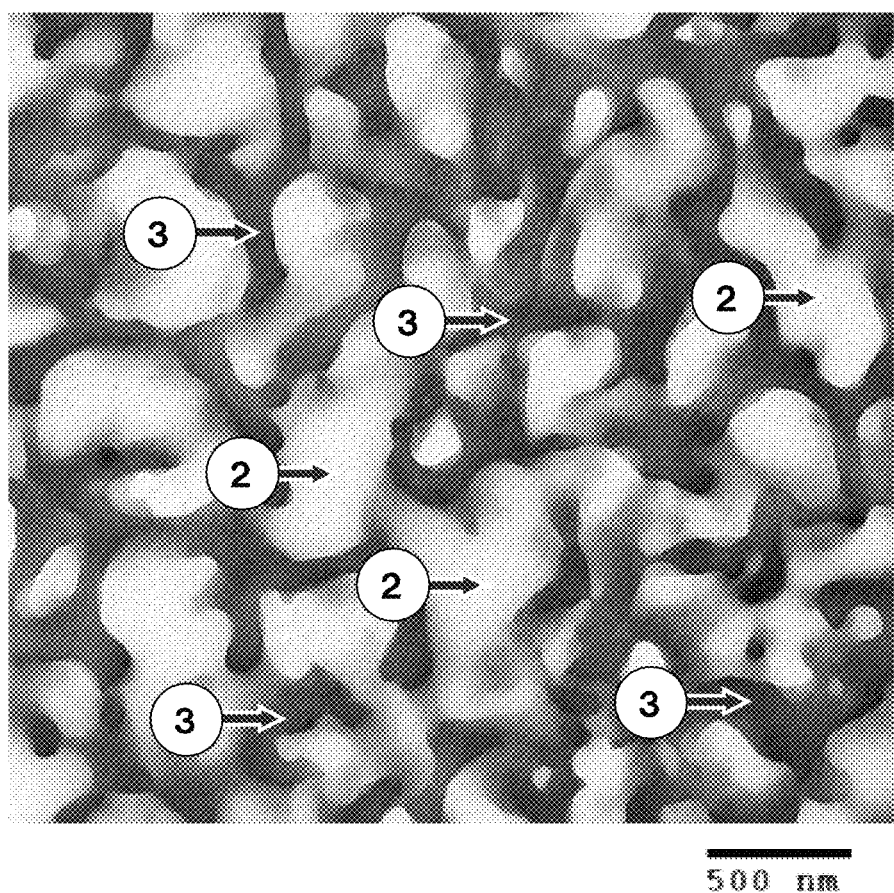
FIG. 3 is a transmission electron photomicrograph of the porous-carbon-material precursor of Example 10, which has pores.

In the case of the porous-carbon-material precursor having pores, the term "continuous porous structure" means that a structure in which branches (carbonizable resin part) 3 and pores (voids) 2 are respectively continued inward is observed, as shown in FIG. 3 that is a transmission electron photomicrograph of the porous-carbon-material precursor having pores (Example 10) obtained from the porous-carbon-material precursor having no pores of Example 9, which is shown in FIG. 2, by subjecting the precursor to a decomposition treatment with water, which will be described later, to remove the PVP serving as an eliminable resin.

In the case of the porous-carbon-material precursor having no pores, the term "continuous phase" means that a structure in which branches (carbonizable resin part) 3 and an eliminable resin part (part which is to be voids) 4 are respectively continued inward is observed, as shown in FIG. 2 that is a transmission electron photomicrograph of the porous-carbon-material precursor having no pores of Example 9. The carbonizable resin part in the case shown in FIG. 2 is a polyacrylonitrile resin part (white phase), and the eliminable resin part therein is a PVP resin part (black phase).

The expression "the state in which a carbonizable resin and an eliminable resin each form a continuous phase" herein means that a state in which a carbonizable resin and an eliminable resin each form a continuous phase can be observed either by a simplified method using a transmission electron microscope or by detailed analysis using electron-beam tomography or X-ray CT method. In cases when the electron-beam contrast between the carbonizable resin and the eliminable resin is insufficient and it is difficult to examine the state, a preferred embodiment is to perform electron staining suitably using a heavy metal or the like before the precursor is examined. Meanwhile, the expression "portion that is substantially constituted only of a carbonizable resin" means such a portion that when a cross-section thereof formed by the cross-section polisher method (CP method) is examined at a magnification of 1±0.1 (nm/pixel), the size of any eliminable resin is below the resolution and, hence, no distinct eliminable resin is observed. Namely, that expression means that a portion in which a carbonizable resin only is observed is present over an area that is not smaller than a square region in which each side corresponds to three times the structural period L calculated from X-ray analysis, which will be described later.

The porous-carbon-material precursor having pores of embodiments of the invention has a portion having a continuous porous structure and a portion having substantially no continuous porous structure and is useful because this precursor, when carbonized, becomes the porous carbon material of the invention, which has a portion having a continuous porous structure and a portion having substantially no continuous porous structure. Meanwhile, the porous-carbon-material precursor having no pores of the invention has a portion where a carbonizable resin and an eliminable resin each form a continuous phase and a portion that is substantially constituted only of a carbonizable resin, and the eliminable resin disappears during carbonization to form pores. Consequently, this precursor is useful because the precursor, when carbonized, becomes the porous carbon material of the invention, which has a portion having a continuous porous structure and a portion having substantially no continuous porous structure.

It is important, according to exemplary embodiments of the invention, that the portion having the continuous porous structure of the porous-carbon-material precursor having pores of the invention has a structural period of 0.003 to 2 μm. The structural period of the portion having the continuous porous structure of the porous-carbon-material precursor having pores of the invention is defined by the structural period calculated by the small-angle X-ray scattering method described under [Structural Period of Portion Having Interconnected Porous Structure].

It is also important, according to exemplary embodiments of the invention, that the portion where a carbonizable resin and an eliminable resin each form a continuous phase, in the porous-carbon-material precursor having no pores of the invention, has a structural period of 0.003 to 2 μm. The structural period of the portion where a carbonizable resin and an eliminable resin each form a continuous phase, in the porous-carbon-material precursor having no pores of the invention, is defined by the structural period calculated by the small-angle X-ray scattering method described above under [Structural Period of Portion having Interconnected Porous Structure]. In structural-period determination, the portion substantially constituted only of a carbonizable resin exerts no influence on the data because the structural period thereof is outside the range. Consequently, in the invention, the structural period determined through an examination of a specimen in the state of containing the portion substantially including a carbonizable resin only is taken as the structural period of the portion where a carbonizable resin and an eliminable resin each form a continuous phase.

In the invention, "porous-carbon-material precursor" is a term which especially means a precursor material that is just before being subjected to carbonization for finally obtaining a porous carbon material. Namely, the porous-carbon-material precursor is a precursor material which can be converted into a porous carbon material merely by a post-carbonization treatment. In the case where the <Process for Producing the Porous Carbon Material> which will be described later includes one or more of other steps including a heat treatment, treatment for imparting infusibility, and decomposition treatment, which will be described later, in addition to step 1 and step 2 before the pyrolysis step, that term means the precursor material which has undergone such other steps. Meanwhile, in this description, the mere wording "precursor material" is a general term for each of the materials in respective stages before carbonization in the process for producing a porous carbon material according to the invention.

Namely, the term "porous-carbon-material precursor having no pores" means a precursor which is in such a state that a porous carbon material is obtained by merely subjecting the precursor to a post-carbonization treatment to thereby cause the eliminable resin to disappear and carbonize the carbonizable resin part. Meanwhile, the term "porous-carbon-material precursor having pores" means a precursor which already has pores before carbonization because at least some of the eliminable resin has disappeared due to a decomposition treatment, etc. and which, in the case where no eliminable resin remains therein, is in such a state that a porous carbon material is obtained therefrom by carbonizing the carbonizable resin part. It should, however, be noted that the porous-carbon-material precursors may be suitably subjected before the carbonization step to a treatment for imparting infusibility and a decomposition treatment, which will be described later, for the purpose of heightening quality or yield.

<Process for Producing the Porous-Carbon-Material Precursors>

The porous-carbon-material precursors of the invention can be produced, for example, by a production process including: a step in which a carbonizable resin and an eliminable resin are brought into a compatibly mixed state to obtain a resin mixture (step 1); and a step in which a porous-carbon-material precursor is obtained by a step in which the resin mixture in a compatibly mixed state is caused to undergo phase separation and the separated phases are fixed (step 2). There are cases where the process further includes other steps including a heat treatment, treatment for imparting infusibility, and decomposition treatment, which will be described later, in addition to the step 1 and the step 2. Details thereof are as described below under <Process for Producing the Porous Carbon Material>.

<Process for Producing the Porous Carbon Material>

The porous carbon material of the invention can be produced, for example, by a production process including: a step in which a carbonizable resin and an eliminable resin are brought into a compatibly mixed state to obtain a resin mixture (step 1); a step in which a precursor material or a porous-carbon-material precursor is obtained by a step in which the resin mixture in a compatibly mixed state is caused to undergo phase separation and the separated phases are fixed (step 2); and a step in which the porous-carbon-material precursor is carbonized by pyrolysis (step 3).

[Step 1]

Step 1 is a step in which 10 to 90% by weight of a carbonizable resin and 90 to 10% by weight of an eliminable resin are brought into a compatibly mixed state to obtain a resin mixture.

The carbonizable resin is a resin which carbonizes upon pyrolysis and remains as a carbon material, and both a thermoplastic resin and a thermosetting resin can be used. In the case of a thermoplastic resin, it is preferred to select a resin which can be rendered infusible by a simple process such as heating or irradiation with high-energy rays. In the case of a thermosetting resin, there are many cases where a treatment for imparting infusibility is unnecessary, and thermosetting resins also are included in suitable materials. Examples of the thermoplastic resin include poly(phenylene oxide), poly(vinyl alcohol), polyacrylonitrile, phenolic resins, and wholly aromatic polyesters. Examples of the thermosetting resin include unsaturated polyester resins, alkyd resins, melamine resins, urea resins, polyimide resins, diallyl phthalate resins, lignin resins, and urethane resins. These resins may be used either alone or in a mixed state. However, in an embodiment which is preferred from the standpoint of ease of molding, thermoplastic resins are mixed with each other or thermosetting resins are mixed with each other.

In a preferred embodiment, thermoplastic resins are used among those from the standpoints of carbonization yield, moldability, and profitability. Of these, poly(phenylene oxide), poly(vinyl alcohol), polyacrylonitrile, and wholly aromatic polyesters can be suitably used.

Meanwhile, the eliminable resin is a resin which can be removed subsequently to the step 2, which will be described layer, in any of the following stages: simultaneously with a treatment for imparting infusibility; after the treatment for imparting infusibility; and simultaneously with the pyrolysis. Methods for removing the eliminable resin, i.e., the [decomposition treatment], are not particularly limited, and suitable methods include: a method in which the eliminable resin is chemically removed, for example, by conducting depolymerization using a chemical; a method in which the eliminable resin is dissolved away by adding a solvent capable of dissolving the eliminable resin; and a method in which the resin mixture is heated to lower the molecular weight of the eliminable resin by thermal decomposition, thereby removing the eliminable resin. These techniques can be used alone or in combination thereof. In the case of using a combination, the techniques may be simultaneously performed or separately performed.

As the method in which the resin is chemically removed, a method in which the resin is hydrolyzed using an acid or an alkali is preferred from the standpoints of profitability and handleability. Examples of resins which are susceptible to hydrolysis by acids or alkalis include polyesters, polycarbonates, and polyamides.

Preferred examples of the method in which the eliminable resin is removed by adding a solvent capable of dissolving the eliminable resin include: a method in which the solvent is continuously supplied to the carbonizable resin and eliminable resin which have been mixed, thereby dissolving and removing the eliminable resin; and a method in which the solvent and the resins are mixed batchwise to dissolve and remove the eliminable resin.

Specific examples of the eliminable resin which are suitable for the method of removing by solvent addition include polyolefins such as polyethylene, polypropylene, and polystyrene, acrylic resins, methacrylic resins, polyvinylpyrrolidone, aliphatic polyesters, and polycarbonates. Of these, amorphous resins are preferred from the standpoint of solubility in the solvent, and examples thereof include polystyrene, methacrylic resins, and polycarbonates.

Examples of the method in which the eliminable resin is lowered in molecular weight by thermal decomposition and removed thereby include: a method in which the carbonizable resin and eliminable resin that have been mixed are heated batchwise to decompose the eliminable resin; and a method in which the carbonizable resin and eliminable resin that have been continuously mixed are continuously supplied to a heating source and heated to thereby decompose the eliminable resin.

It is preferable that the eliminable resin is, among those resins, a resin that disappears in the step 3, which will be described later, through thermal decomposition when the carbonizable resin is carbonized by pyrolysis. It is preferable that the eliminable resin is a thermoplastic resin that does not undergo a large chemical change when the carbonizable resin is subjected to the treatment for imparting infusibility, which will be described later, and that, through pyrolysis, gives a carbonization yield of less than 10%. Specific examples of such eliminable resins include polyolefins such as polyethylene, polypropylene, and polystyrene, acrylic resins, methacrylic resins, polyacetals, polyvinylpyrrolidone, aliphatic polyesters, aromatic polyesters, aliphatic polyamides, and polycarbonates. These resins may be used either alone or in a mixed state.

In the step 1, the carbonizable resin and the eliminable resin are brought into a compatibly mixed state to obtain a resin mixture (polymer alloy). The expression "brought into a compatibly mixed state" herein means that by suitably selecting conditions regarding temperature and/or solvent, a state that no structure in which the carbonizable resin and the eliminable resin are present as separate phases is observed with an optical microscope, is produced.

The carbonizable resin and the eliminable resin may be brought into a compatibly mixed state by mixing the resins alone with each other or by further adding a solvent thereto.

Examples of a system in which a plurality of resins have been brought into a compatibly mixed state include: a system which shows a phase diagram of the upper-limit critical solution temperature (UCST) type in which the resins are in a phase-separated state at low temperatures but form a single phase at high temperatures; and a system which conversely shows a phase diagram of the lower-limit critical solution temperature (LCST) type in which the resins are in a phase-separated state at high temperatures but form a single phase at low temperatures. Furthermore, especially in the case of a system in which at least one of the carbonizable resin and the eliminable resin has been dissolved in a solvent, preferred examples include one in which the phase separation, which will be described later, is induced by the infiltration of a nonsolvent.

The solvent to be added is not particularly limited. Preferred is such a solvent that the absolute value of the difference between the solubility parameter (SP value) thereof and the average of the SP values of the carbonizable resin and eliminable resin is 5.0 or less, the absolute value being an index to dissolving properties. It is known that the smaller the absolute value of the difference from the average of the SP values, the higher the dissolving properties. It is therefore preferable that the difference is zero. Meanwhile, the larger the absolute value of the difference from the average of the SP values, the lower the dissolving properties and the more the compatibly mixed state of the carbonizable resin and eliminable resin is difficult to attain. In view of this, the absolute value of the difference from the average of the SP values is preferably 3.0 or less, most preferably 2.0 or less.

Specific examples of carbonizable resin/eliminable resin combinations to be brought into a compatibly mixed state, in the case where the system contains no solvent, include poly(phenylene oxide)/polystyrene, poly(phenylene oxide)/styrene-acrylonitrile copolymer, wholly aromatic polyester/poly(ethylene terephthalate), wholly aromatic polyester/poly(ethylene naphthalate), and wholly aromatic polyester/polycarbonate. Specific examples of the combinations, in the case where the system contains a solvent, include polyacrylonitrile/poly(vinyl alcohol), polyacrylonitrile/polyvinylphenol, polyacrylonitrile/polyvinylpyrrolidone, polyacrylonitrile/poly(lactic acid), poly(vinyl alcohol)/vinyl acetate-vinyl alcohol copolymer, poly(vinyl alcohol)/poly(ethylene glycol), poly(vinyl alcohol)/poly(propylene glycol), and poly(vinyl alcohol)/starch.

Methods for mixing the carbonizable resin with the eliminable resin are not limited, and various known mixing techniques can be employed so long as even mixing is possible therewith. Examples, thereof include a rotary mixer having stirring blades and a kneading extruder with screws.

In a preferred embodiment, the temperature (mixing temperature) at which the carbonizable resin and the eliminable resin are mixed together is not lower than a temperature at which both the carbonizable resin and the eliminable resin soften. As the temperature at which the resins soften, either the melting point of the carbonizable resin or eliminable resin in the case where the resin is a crystalline polymer or the glass transition temperature thereof in the case where the resin is an amorphous resin may be suitably selected. By setting the mixing temperature at a temperature not lower than the temperature at which both the carbonizable resin and the eliminable resin soften, the viscosity of the two resins can be lowered and, hence, more efficient stirring and mixing are possible. There is no particular upper limit on the mixing temperature, but the temperature is preferably 400° C. or lower from the standpoint of preventing resin deterioration due to thermal degradation, thereby obtaining a precursor for the porous carbon material, which has excellent quality.

In the step 1, 10 to 90% by weight of the carbonizable resin is mixed with 90 to 10% by weight of the eliminable resin. In the case where the proportions of the carbonizable resin and eliminable resin are within those ranges, an optimal pore size and an optimal porosity can be arbitrarily designed. Those proportion ranges are hence preferred. So long as the proportion of the carbonizable resin is 10% by weight or larger, not only it is possible to give a carbonized material which retains mechanical strength but also an improved yield results; such proportions are hence preferred. Meanwhile, so long as the proportion of the carbonizable material is 90% by weight or less, the eliminable resin can efficiently form voids; such proportions are hence preferred.

A mixing ratio between the carbonizable resin and the eliminable resin can be arbitrarily selected within the range while taking account of the compatibility of each material. Specifically, since compatibility between resins generally becomes worse as the ratio therebetween approaches 1:1, preferred embodiments in the case where a system having not so high compatibility has been selected as starting materials include one in which the compatibility is improved by making the mixture approach to a so-called partial composition by increasing or reducing the amount of the carbonizable resin.

In a preferred embodiment, a solvent is added when the carbonizable resin and the eliminable resin are mixed with each other. The addition of a solvent not only lowers the viscosity of the carbonizable resin and eliminable resin to facilitate molding but also renders the carbonizable resin and the eliminable resin easy to bring into a compatibly mixed state. The solvent here is also not particularly limited, and any solvent which is liquid at ordinary temperature and in which at least one of the carbonizable resin and the eliminable resin is soluble or swellable may be used. In a more preferred embodiment, a solvent in which both the carbonizable resin and the eliminable resin dissolve is used because the compatibility between both resins can be improved.

It is preferable that the amount of the solvent to be added is 20% by weight or larger based on the total weight of the carbonizable resin and the eliminable resin, from the standpoints of improving the compatibility between the carbonizable resin and the eliminable resin and lowering the viscosity thereof to improve the flowability. Meanwhile, from the standpoint of the cost of the recovery and recycling of the solvent, the addition amount thereof is preferably 90% by weight or less based on the total weight of the carbonizable resin and the eliminable resin.

[Step 2]

Step 2 is a step in which the resin mixture that has been brought into a compatibly mixed state in the step 1 is caused to undergo phase separation to form a microstructure and this microstructure is fixed to obtain either a precursor material or a porous-carbon-material precursor having no pores.

Methods by which the carbonizable resin and eliminable resin that have been mixed together are caused to undergo phase separation are not particularly limited.

Examples thereof include: a temperature-induction phase separation method in which phase separation is induced by a temperature change; a nonsolvent-induction phase separation method in which phase separation is induced by adding a nonsolvent; and a reaction-induction phase separation method in which phase separation is induced using a chemical reaction.

These phase separation methods can be used alone or in combination thereof. Specific examples of methods in the case of using a combination include: a method in which the mixture is passed through a coagulating bath to cause nonsolvent-induced phase separation and the mixture is then heated to cause heat-induced phase separation; a method in which nonsolvent-induced phase separation and heat-induced phase separation are simultaneously caused by controlling the temperature of a coagulating bath; and a method in which the material ejected from a spinning nozzle is cooled to cause heat-induced phase separation and is then brought into contact with a nonsolvent.

In a preferred embodiment, the phase separation is accompanied with no chemical reaction. The expression "accompanied with no chemical reaction" herein means that either of the carbonizable resin and eliminable resin which have been mixed undergoes no change in primary structure through the mixing. The term "primary structure" means the chemical structure which constitutes the carbonizable resin or the eliminable resin. In the case where the phase separation is accompanied with no chemical reaction, a porous-carbon-material precursor having no pores can be obtained without impairing the mechanical and chemical properties of the carbonizable resin and/or eliminable resin and, hence, structures of any desired shape such as a fiber or film shape can be molded without considerably changing the molding conditions. This embodiment is hence preferred. Especially in the case where a microstructure has been formed through phase separation without causing a crosslinking reaction or the like and the microstructure has been fixed, no considerable increase in elastic modulus due to crosslinking reaction is observed and a flexible structure can be maintained during molding. Because of this, excellent passability through steps for fiber or film production can be obtained without suffering thread breakage or film rupture, so that a precursor material or a porous-carbon-material precursor having no pores can be efficiently obtained at low cost.

[Decomposition Treatment]

It is preferable that the precursor material or porous-carbon-material precursor having no pores, which is the resin mixture in which a microstructure resulting from the phase separation has been fixed in the step 2, is subjected to a decomposition treatment before being subjected to the carbonization step (step 3). The precursor material in which the eliminable resin has been removed by this decomposition treatment and which is in such a state that a porous carbon material is obtainable therefrom by conducting carbonization after this step becomes a porous-carbon-material precursor having pores. Namely, the precursor material or the porous-carbon-material precursor having no pores, through the decomposition treatment, becomes a porous-carbon-material precursor having pores because the eliminable resin is removed therefrom. Methods for the decomposition treatment are not particularly limited, and any method may be used so long as the eliminable resin can be decomposed and removed thereby. Specifically, suitable methods include: a method in which the eliminable resin is chemically decomposed and lowered in molecular weight using an acid, alkali, or enzyme and is removed thereby; a method in which the eliminable resin is dissolved away with a solvent capable of dissolving the eliminable resin; and a method in which the eliminable resin is depolymerized using radiation, such as electron beams, gamma rays, ultraviolet rays, or infrared rays, to thereby remove the eliminable resin.

Especially in the case of a porous-carbon-material precursor in which the eliminable resin can be decomposed through thermal decomposition, use may be made of a method in which a heat treatment is conducted beforehand at such a temperature that at least 80% by weight of the eliminable resin disappears, or use may be made of a method in which the eliminable resin is gasified by thermal decomposition and removed simultaneously with carbonization in the carbonization step (step 3) or in the treatment for imparting infusibility which will be described later. In a more suitable embodiment, the method is selected in which the eliminable resin is gasified by thermal decomposition and removed simultaneously with heat treatment in the carbonization step (step 3) or in the treatment for imparting infusibility which will be described later, from the standpoint of reducing the number of steps to heighten the production efficiency. In particular, use may be made of a method in which a porous-carbon-material precursor having no pores is subjected to a decomposition treatment simultaneously with carbonization in the carbonization step (step 3). This method is a preferred embodiment because not only a cost reduction due to the reduction in the number of steps but also an improvement in yield are expected.

[Treatment for Imparting Infusibility]

It is preferable that the precursor material or porous-carbon-material precursor, which is the resin mixture in which a microstructure resulting from the phase separation has been fixed in the step 2, is subjected to a treatment for imparting infusibility before being subjected to the carbonization step (step 3). The precursor material which has been thus brought into such a state that a porous carbon material is obtainable therefrom by merely conducting carbonization after the treatment for imparting infusibility becomes a porous-carbon-material precursor. Methods for the treatment for imparting infusibility are not particularly limited, and known methods can be used. Specific examples of the methods include: a method in which the precursor is heated in the presence of oxygen to thereby cause oxidative crosslinking; a method in which the precursor is irradiated with high-energy rays such as electron beams or gamma rays to form a crosslinked structure; and a method in which a substance having a reactive group is immersed or mixed to form a crosslinked structure. Of these, the method in which the precursor is heated in the presence of oxygen to thereby cause oxidative crosslinking is preferred because the process is simple and the production cost can be reduced. These techniques can be used alone or in combination thereof, and the techniques may be used either simultaneously or separately.

The heating temperature in the method in which the precursor is heated in the presence of oxygen to thereby cause oxidative crosslinking is preferably a temperature of 150° C. or higher from the standpoint of causing the crosslinking reaction to proceed efficiently, but is preferably a temperature of 350° C. or lower from the standpoint of preventing the yield from being impaired by a weight loss due to the thermal degradation, combustion, etc. of the carbonizable resin.

There are no particular limitations on oxygen concentration during the treatment. However, a preferred embodiment is one in which a gas having an oxygen concentration of 18% or higher is supplied, in particular, air is supplied as such, because use of such gas makes it possible to reduce the production cost. Methods for supplying the gas are not particularly limited, and examples thereof include a method in which air is supplied as such to the heating device and a method in which pure oxygen is supplied to the heating device using, for example, a bomb.

Examples of the method in which the precursor is irradiated with high-energy rays such as electron beams or gamma rays to form a crosslinked structure include a method in which a commercial device such as an electron beam generator or gamma ray generator is used to irradiate the carbonizable resin with electron beams or gamma rays to thereby induce crosslinking. A lower limit of the irradiation intensity is preferably 1 kGy or higher from the standpoint of efficiently introducing a crosslinked structure by the irradiation, and the irradiation intensity is preferably 1,000 kGy or less from the standpoint of preventing the material strength from being reduced by a decrease in molecular weight due to cleavage of the main chain.

Examples of the method in which a substance having a reactive group is immersed or mixed to form a crosslinked structure include: a method in which a low-molecular-weight compound having a reactive group is immersed into the resin mixture, followed by heating or irradiating with high-energy rays to cause a crosslinking reaction to proceed; and a method in which a low-molecular-weight compound having a reactive group is mixed beforehand, followed by heating or irradiating with high-energy rays to cause a crosslinking reaction to proceed.

A suitable method is to conduct a decomposition treatment simultaneously with the treatment for imparting infusibility, because the benefit of a cost reduction due to the reduction in the number of steps can be expected. The precursor material or the porous-carbon-material precursor having no pores becomes a porous-carbon-material precursor having pores, through the decomposition treatment conducted simultaneously with the treatment for imparting infusibility.

[Step 3]

Step 3 is a step in which the porous-carbon-material precursor, which is the resin mixture in which a microstructure resulting from the phase separation has been fixed in the step 2, is pyrolyzed and carbonized to obtain a porous carbon material. In the case where this precursor is one which has undergone a decomposition treatment beforehand, this precursor is a porous-carbon-material precursor having pores. Meanwhile, in the case where the precursor is one which is to be subjected to a decomposition treatment simultaneously with this step, this precursor is a porous-carbon-material precursor having no pores.

It is preferable that the pyrolysis is conducted by heating the porous-carbon-material precursor in an inert gas atmosphere to 600° C. or higher in order to sufficiently carbonize the precursor. The term "inert gas" herein means a gas which is chemically inert during the heating. Examples thereof include helium, neon, nitrogen, argon, krypton, xenon, and carbon dioxide. In an embodiment preferred from the standpoint of profitability, nitrogen or argon is used among these. Especially in the case where the carbonization temperature is 1,500° C. or higher, it is preferred to use argon from the standpoint of inhibiting the formation of nitrides.

The flow rate of the inert gas is not limited so long as the oxygen concentration in the atmosphere within the heating device can be sufficiently lowered, and it is preferred to suitably select an optimal value in accordance with the size of the heating device, amount of the feed material being supplied, heating temperature, etc. Although there is no particular upper limit on the flow rate thereof, it is preferred to suitably set the flow rate in accordance with a temperature distribution or the design of the heating device, from the standpoints of profitability and of reducing temperature differences within the heating device. In a more preferred embodiment, the gases which generate during the carbonization are discharged from the system. This is because in cases when the gases can be sufficiently discharged, a porous carbon material having excellent quality can be obtained. It is therefore preferred to determine the flow rate of the inert gas so that the concentration of the generated gases in the system is 3,000 ppm or less.

There is no upper limit on the temperature at which the precursor is heated. However, temperatures not higher than 3,000° C. are preferred from the standpoint of profitability because the carbonization can be caused to proceed sufficiently at such temperatures and because the equipment requires no special processing.

With respect to heating methods in the case where the carbonization treatment is continuously performed, use may be made of a method in which the material is continuously fed to and taken out from the heating device kept at a constant temperature, using rollers, conveyor, or the like. This method is preferred because the production efficiency can be heightened.

Meanwhile, in the case where a batch treatment is conducted in a heating device, there is no particular lower limit on the heating rate and cooling rate. However, rates of 1° C./min or higher are preferred because the time period required for the heating and cooling can be shortened therewith to thereby heighten the production efficiency. There is no particular upper limit on the heating rate and cooling rate. It is, however, preferred to employ a rate which is lower than the thermal shock resistance of the member that constitutes the heating device.

It is also preferable that the product obtained by carbonizing the porous-carbon-material precursor by pyrolysis is further subjected to a pulverization treatment.

A conventionally known method can be selected for the pulverization treatment, and it is preferred to suitably select a method in accordance with the particle size to be attained through the pulverization treatment and with treatment amount. Examples of methods for the pulverization treatment include a ball mill, bead mill, and jet mill. Although the pulverization treatment may be continuous or batchwise, a continuous treatment is preferred from the standpoint of production efficiency. The filling material to be charged into the ball mill is suitably selected. However, it is preferable that a material based on a metal oxide, such as alumina, zirconia, or titania, or a material obtained by coating stainless steel, iron, or the like as cores with a nylon, polyolefin, fluorinated polyolefin, or the like is used for applications where inclusion of a metallic material is undesirable. For other applications, use of a metal such as stainless steel, nickel, or iron can be suitable used.

In an embodiment which is preferred from the standpoint of heightening the efficiency of pulverization, a pulverization aid is used during the pulverization. The pulverization aid is selected arbitrarily from among water, alcohols, glycols, ketones, etc. Ethanol and methanol are preferred alcohols from the standpoints of availability and cost. In the case of using a glycol, the glycol preferably is ethylene glycol, diethylene glycol, propylene glycol, or the like. In the case of using a ketone, the ketone preferably is acetone, ethyl methyl ketone, diethyl ketone, or the like.

In a preferred embodiment, the porous carbon material which has undergone the pulverization treatment is classified to give a material which is even in particle size. The porous carbon material which is even in particle size can form an even structure when used as a filler, an additive to pastes, etc., and hence makes it possible to stabilize the efficiency of filling and the step of paste application. Consequently, it can be expected to heighten the production efficiency to attain a cost reduction. With respect to particle size, it is preferred to suitably select the size in accordance with applications of the pulverized porous carbon material.

EXAMPLES

Preferred examples for carrying out the invention are described below, but the following examples should not be construed as limiting the present invention.
Evaluation Methods
[Structural Period of Portion Having Continuous Porous Structure or of Portion where Carbonizable Resin and Eliminable Resin Each Form Continuous Phase]

A porous carbon material or a porous-carbon-material precursor was sandwiched between specimen plates, and the position of a CuKα line source and the positions of the specimen and a two-dimensional detector were regulated so that information on scattering angles less than 10 degrees was obtained from the X-ray source obtained from the CuKα line source. From the image data (luminance information) obtained from the two-dimensional detector, the data on the central portion which had been affected by the beam stopper were excluded. Radius vectors from the beam center were set, and the values of luminance for the range of 360° at angular intervals of 1° were summed up to obtain a scattered-light-intensity distribution curve. From the scattering angle θ corresponding to the position of a peak in the curve obtained, the structural period of the portion having the continuous porous structure or of the portion where a carbonizable resin and an eliminable resin each formed a continuous phase was obtained using the following equation.

$$L = \frac{\lambda}{2\sin\theta}$$ [Math. 2]

Structural period: L
λ: wavelength of incident X-rays
[Average Porosity]

A porous carbon material or a porous-carbon-material precursor was embedded in a resin, and a cross-section of the porous carbon material or porous-carbon-material precursor was thereafter exposed with a razor blade or the like. Using SM-09010, manufactured by JEOL Ltd., argon ion beams were caused to strike on the specimen surface at an accelerating voltage of 5.5 kV to etch the surface. A central part of the resultant cross-section of the porous carbon material was examined with a scanning secondary-electron microscope at a magnification regulated so as to result in 1±0.1 (nm/pixel) and at a resolution of 700,000 pixels or higher, and a square examination region for calculation in which each side had 512 pixels was set in the resulting image. The average porosity was calculated using the following equation, in which A was the area of the examination region and B was the area of the pores or eliminable-resin portion.

Average porosity (%)=$B/A$×100

In the case where the electron-beam contrast between the carbonizable resin and the eliminable resin was weak and it was difficult to examine the specimen, electron staining was conducted by suitably using a heavy metal or the like based on the resin used, before the examination.
[Acquisition of Pore Diameter Distribution Curve]

A porous carbon material or a porous-carbon-material precursor having pores was vacuum-dried under the conditions of 300° C. and 5 hours to thereby remove gas components which had been adsorbed. Thereafter, a pore diameter distribution curve was acquired using AutoPore IV9500, manufactured by Shimadzu Corp.
[Structural Period of Core Layer]

A porous carbon material or a porous-carbon-material precursor was cut in liquid nitrogen, and a central part of the resultant cut surface of the material was examined using S-5500, manufactured by Hitachi High-Technologies Corp., at a magnification which has been set so that the dimension of at least one side is 10 to 100 times the structural period of the core layer. Image data corresponding to a secondary-electron image and having a resolution of 700,000 pixels or higher were acquired, and the image data obtained were trimmed so as to result in a square region in which each side had 512 pixels. The square region was subjected to two-dimensional Fourier transformation, and the characteristic wavelength corresponding to the position of a peak in the resultant one-dimensional spectrum was determined. From the inverse thereof, the structural period of the core layer was determined. This operation was repeatedly performed three times with respect to different specimens, and an average thereof was taken as the structural period.

Example 1

Into a separable flask were introduced 70 g of polyacrylonitrile (Mw, 150,000) manufactured by Polysciences, Inc., 70 g of polyvinylpyrrolidone (Mw, 40,000) manufactured by Aldrich Co., and 400 g of dimethyl sulfoxide (DMSO) manufactured by Wakenyaku Co. Ltd., as a solvent. The contents were heated at 150° C. for 3 hours with stirring and refluxing, thereby preparing an even and transparent solution. In this solution, the concentration of the polyacrylonitrile and the concentration of the polyvinylpyrrolidone were 13% by weight each.

The DMSO solution obtained was cooled to 25° C. and then ejected at a rate of 3 mL/min from a one-orifice nozzle having an orifice diameter of 0.6 mm, and the extrudate was led into a pure-water coagulating bath kept at 25° C., subsequently taken off at a rate of 5 m/min, and accumulated in a vat to thereby obtain raw fibers. In this operation, the air gap was set at 5 mm, and the length of immersion in the coagulating bath was 15 cm. The raw fibers obtained were translucent and had undergone phase separation.

The raw fibers obtained were dried for 1 hour in a circulating drying oven kept at 25° C., thereby removing the water present on the fiber surface. Thereafter, vacuum drying was conducted at 25° C. for 5 hours to obtain dried raw fibers as a precursor material.

The raw fibers as a precursor material were thereafter introduced into an electric furnace kept at 250° C. and heated in an oxygen atmosphere for 1 hour, thereby performing a treatment for imparting infusibility. The raw fibers which had undergone the treatment for imparting infusibility had changed to black in color.

The structure of the infusible raw fibers obtained, i.e., a porous-carbon-material precursor which had no pores and had not undergone a carbonization treatment, was examined by electron-beam tomography. As a result, it was found that a structure derived from the polyacrylonitrile as a carbonizable resin had formed a continuous phase. The portion having the continuous porous structure had a structural period of 0.18 µm. A comparison between the structure of this precursor and that of the porous carbon material which will be described later revealed that the structural period of that portion of the porous carbon material which had a continuous porous structure was mostly shorter than that of the porous-carbon-material precursor because the polyacrylonitrile resin had contracted during the carbonization treatment, and that despite such a change, the pattern configured of both the portion having the continuous porous structure and the portion having substantially no continuous porous structure remained unchanged.

The infusible raw fibers obtained were subjected to a carbonization treatment under the conditions of a nitrogen flow rate of 1 L/min, heating rate of 10° C./min, maximum temperature of 1,500° C., and holding time of 1 minute, thereby obtaining porous carbon fibers.

A central part of the porous carbon fibers obtained, i.e., a porous carbon material, had an average porosity of 40%, and the portion thereof having the continuous porous structure had a structural period of 0.10 µm. This porous carbon material gave a pore diameter distribution curve which had pore diameter distribution peaks respectively at 50 and 200 nm, and analysis of cross-sections thereof revealed that the fiber diameter was 150 µm and the skin layer, which was the portion having no continuous porous structure, had a thickness of 5 µm. The core layer, i.e., the material center part which was the portion having the continuous porous structure, had a structural period of 0.3 µm. Furthermore, an even continuous porous structure was formed in the fiber center part. The results are shown in Table 1.

Example 2

A porous-carbon-material precursor having no pores, which was infusible raw fibers, and porous carbon fibers, i.e., a porous carbon material, were obtained in the same manner as in Example 1, except that the weight of the polyacrylonitrile and that of the polyvinylpyrrolidone were changed to 60 g each and that the concentration of the polyacrylonitrile and that of the polyvinylpyrrolidone were 11.5% by weight each.

A central part of the porous carbon fibers obtained, i.e., a porous carbon material, had an average porosity of 45%, and the portion thereof having the continuous porous structure had a structural period of 0.12 µm. This porous carbon material gave a pore diameter distribution curve which had pore diameter distribution peaks respectively at 70 and 250 nm, and analysis of cross-sections thereof revealed that the fiber diameter was 130 µm and the skin layer, which was the portion having no continuous porous structure, had a thickness of 7 µm. The core layer, i.e., the material center part which was the portion having the continuous porous structure, had a structural period of 0.33 µm. Furthermore, an even continuous porous structure was formed in the fiber center part. This porous carbon material was found to be a material having a structure with excellent evenness and being easy to composite with other materials. The results are shown in Table 1.

Example 3

A porous-carbon-material precursor having no pores, which was infusible raw fibers, and porous carbon fibers, i.e., a porous carbon material, were obtained in the same manner as in Example 2, except that the polyvinylpyrrolidone (Mw, 40,000) was replaced with polyvinylpyrrolidone (Mw, 360,000).

A central part of the porous carbon fibers obtained, i.e., a porous carbon material, had an average porosity of 43%, and the portion thereof having the continuous porous structure had a structural period of 0.11 µm. This porous carbon material gave a pore diameter distribution curve which had pore diameter distribution peaks respectively at 60 and 230 nm, and analysis of cross-sections thereof revealed that the fiber diameter was 130 µm and the skin layer, which was the portion having no continuous porous structure, had a thickness of 6 µm. The core layer, i.e., the material center part which was the portion having the continuous porous structure, had a structural period of 0.31 µm. Furthermore, an even continuous porous structure was formed in the fiber center part. This porous carbon material was found to be a material having a structure with excellent evenness and being easy to composite with other materials. The results are shown in Table 1.

Example 4

Into a separable flask were introduced 70 g of polyacrylonitrile (Mw, 150,000) manufactured by Polysciences, Inc., 70 g of polyvinylpyrrolidone (Mw, 40,000) manufactured by Aldrich Co., and 400 g of DMSO manufactured by Wakenyaku Co. Ltd., as a solvent. The contents were heated at 150° C. for 3 hours with stirring and refluxing, thereby preparing an even and transparent solution. In this solution, the concentration of the polyacrylonitrile and the concentration of the polyvinylpyrrolidone were 13% by weight each.

The DMSO solution obtained was dropped onto a glass substrate kept at 25° C. and applied thereto with an applicator having a gap of 100 µm and a width of 90 mm. Thereafter, the solution applied was immersed, together with the glass substrate, in pure water for 30 seconds and then peeled off. The resultant film was translucent, and phase separation proceeded therein.

The film obtained was dried for 1 hour in a circulating drying oven kept at 25° C., thereby removing the water present on the film surface. Thereafter, vacuum drying was conducted at 25° C. for 5 hours to obtain a dried film as a precursor material.

Thereafter, the film as a precursor material was introduced into an electric furnace kept at 250° C. and heated for 1 hour, thereby performing a treatment for imparting infusibility. The film which had undergone the treatment for imparting infusibility had changed to black in color.

The infusible film obtained, i.e., a porous-carbon-material precursor having no pores, was subjected to a carbonization treatment under the conditions of a nitrogen flow rate of 1 L/min, heating rate of 10° C./min, maximum temperature of 1,500° C., and holding time of 1 minute, thereby obtaining a porous carbon film.

A central part of the porous carbon film obtained, i.e., porous carbon material, had an average porosity of 39%, and the portion thereof having the continuous porous structure had a structural period of 0.09 μm. This porous carbon material gave a pore diameter distribution curve which had pore diameter distribution peaks respectively at 50 and 200 nm, and it was found from the shape of cross-sections thereof that the film thickness was 80 μm and the skin layer, which was the portion having no continuous porous structure, had a thickness of 5 μm. The core layer, i.e., the material center part which was the portion having the continuous porous structure, had a structural period of 0.29 μm. Furthermore, an even continuous porous structure was formed in the film center part. This porous carbon material was found to be a material having a structure with excellent evenness and being easy to composite with other materials. The results are shown in Table 1.

Comparative Example 1

Two copolymers, i.e., 60% by weight of an acrylonitrile copolymer (PAN copolymer) configured from 98% by mole of acrylonitrile and 2% by mole of methacrylic acid and having a relative viscosity of 0.24 and 40% by weight of a heat-decomposable copolymer (PMMA copolymer) configured from 99% by mole of methyl methacrylate and 1% by mole of methyl acrylate and having a relative viscosity of 0.21, were mixed with each other and dissolved in dimethylformamide (DMF) as a solvent so that the concentration of the mixture of the two copolymers in the solution was 24.8% by weight, thereby obtaining a DMF mixture solution. The solution obtained was even in a visual examination. However, droplets were observed in an examination with an optical microscope, showing that phase separation had already proceeded in the solution stage.

This DMF mixture solution was used, and spinning, infusibility impartation, and carbonization treatment were conducted in the same manner as in Example 1 to obtain infusible raw fibers and porous carbon fibers. The infusible raw fibers and porous fibers obtained were not even in the shape and size of the pores within the cross-section, and the skin layer was indistinct. In particular, a large number of pores were formed in the skin layer portion and, hence, the porous fibers obtained had such a shape that it was difficult to composite the porous fibers with other materials or to use the porous fibers as a separation membrane material. Although a calculation for structural-period determination was attempted, the spectrum obtained had no peak, showing that the porous fibers were poor in structural evenness. The results are shown in Table 1.

Comparative Example 2

In 325 mL of chloroform was dissolved 15.0 g of poly (phenylene oxide). Thereto was added dropwise a solution obtained by dissolving 8.5 mL of chlorosulfuric acid in 85 mL of chloroform. The resultant mixture was reacted at room temperature for 30 minutes to obtain a sulfonated poly(phenylene oxide). This sulfonated poly(phenylene oxide) was dissolved in an amount of 4.0 g as a carbonizable resin in 10.5 g of methanol to obtain an even solution containing the poly(phenylene oxide) derivative polymer in a concentration of 27.5% by weight.

This methanol solution was used, and spinning, infusibility impartation, and carbonization treatment were conducted in the same manner as in Example 1 to obtain infusible raw fibers and porous carbon fibers. The infusible raw fibers and porous carbon fibers obtained were not even in the shape and size of the pores within the cross-section, and the skin layer and the material center part had a large number of coarse pores formed therein. The porous fibers obtained hence had such a shape that it was difficult to composite the porous fibers with other materials or to use the porous fibers as a separation membrane material. Although a calculation for structural-period determination was attempted, the spectrum obtained had no peak, showing that the porous fibers were poor in structural evenness. The results are shown in Table 1.

Comparative Example 3

Infusible raw fibers and porous carbon fibers were obtained in the same manner as in Example 1, except that the polyacrylonitrile (Mw, 150,000) manufactured by Polysciences, Inc. was used in an amount of 140 g, the polyvinylpyrrolidone (Mw, 40,000) manufactured by Sigma-Aldrich Corp. was not added, and the concentration of the polyacrylonitrile was regulated to 26% by weight. The DMSO solution evenly prepared at 150° C. through 3-hour stirring and refluxing was transparent and even.

The infusible raw fibers and porous carbon fibers obtained were not even in the shape and size of the pores within the cross-section, and the skin layer and the material center part had a large number of coarse pores formed therein. The porous fibers obtained hence had such a shape that it was difficult to composite the porous fibers with other materials or to use the porous fibers as a separation membrane material. Although a calculation for determining the structural period of the core layer was attempted, the spectrum obtained had no peak, showing that the porous fibers were poor in structural evenness. The results are shown in Table 1.

Example 5

A porous-carbon-material precursor having no pores, which was infusible raw fibers, and porous carbon fibers, i.e., a porous carbon material, were obtained in the same manner as in Example 1, except that the polyvinylpyrrolidone (Mw, 40,000) manufactured by Sigma-Aldrich Corp. was replaced with poly(N-vinylpyrrolidone 70%/vinyl acetate 30%: P(VP7/VAC3)) purchased from Wako Pure Chemical Industries, Ltd. The properties of the infusible raw fibers and porous carbon fibers obtained are shown in Table 1.

Example 6

A porous-carbon-material precursor having no pores, which was infusible raw fibers, and porous carbon fibers, i.e., a porous carbon material, were obtained in the same manner as in Example 1, except that the polyvinylpyrrolidone (Mw, 40,000) manufactured by Sigma-Aldrich Corp. was replaced with poly(styrene 94%/ally alcohol 6%: PS94AA6) manufactured by Polyscience, Inc. The properties of the infusible raw fibers and porous carbon fibers obtained are shown in Table 1.

Example 7

The porous carbon fibers obtained in Example 1 were pulverized using a ball mill to obtain a porous carbon powder. In the porous carbon powder obtained, the portion having the continuous porous structure had an average porosity of 40% and a structural period of 0.10 μm. This powder had a structure which further included, as some of each particle, a portion having no continuous porous structure. The results are shown in Table 1.

Example 8

A porous-carbon-material precursor having no pores, which was infusible raw fibers, and porous carbon fibers were obtained in the same manner as in Example 1, except that when the DMSO solution which had been obtained and cooled to 25° C. was ejected at a rate of 3 mL/min from a one-orifice nozzle having an orifice diameter of 0.6 mm, pure water kept at 25° C. was applied only to the one-side surface of the fiber. The porous carbon fibers obtained were each a fiber, most of which had a continuous porous structure but which had such a structure that the fiber surface partly had a portion having no continuous porous structure. The portion having no continuous porous structure accounted for 10% by volume of the fibers. That portion of the porous carbon fibers obtained which had the continuous porous structure had a structural period of 0.11 μm.

Example 9

A porous-carbon-material precursor having no pores, which was infusible raw fibers, and porous carbon fibers were obtained in the same manner as in Example 1, except that the weight of the polyacrylonitrile and that of the polyvinylpyrrolidone were changed to 35.3 g each and that the concentration of the polyacrylonitrile and that of the polyvinylpyrrolidone were 7.5% by weight each.

A central part of the porous carbon fibers obtained, i.e., a porous carbon material, had an average porosity of 44%, and the portion thereof having the continuous porous structure had a structural period of 0.22 μm. This porous carbon material gave a pore diameter distribution curve which had pore diameter distribution peaks respectively at 80 and 320 nm, and analysis of cross-sections thereof revealed that the fiber diameter was 140 μm and the skin layer, which was the portion having no continuous porous structure, had a thickness of 6 μm. The core layer, i.e., the material center part which was the portion having the continuous porous structure, had a structural period of 0.45 μm. Furthermore, an even continuous porous structure was formed in the fiber center part. This porous carbon material was found to be a material having a structure with excellent evenness and being easy to composite with other materials.

Example 10

The porous-carbon-material precursor having no pores which had been obtained in Example 9 was immersed for 24 hours in distilled water kept at 90° C., in a bath ratio of 1:100. Thereafter, the precursor was dried for 6 hours in a 90° C. hot-air circulating oven to obtain a porous-carbon-material precursor having pores formed by decomposing the eliminable resin. The resultant porous-carbon-material precursor having pores had a structural period of 0.23 μm.

The subsequent procedure was conducted in the same manner as in Example 9 to obtain porous carbon fibers. The properties of the porous carbon fibers obtained are shown in Table 1.

TABLE 1

|  |  | Unit | Ex. 1 | Ex. 2 | Ex. 3 | Ex. 4 | Comp. Ex. 1 | Comp. Ex. 2 | Comp. Ex. 3 |
|---|---|---|---|---|---|---|---|---|---|
| Carbonizable resin | Kind | — | PAN | PAN | PAN | PAN | PAN copolymer | PPO derivative | PAN |
|  | Molecular weight | ×10,000 | 15.0 | 15.0 | 15.0 | 15.0 | — | — | 15.0 |
|  | Concentration | wt % | 13.0 | 11.5 | 11.5 | 13.0 | 14.9 | 27.5 | 26.0 |
| Eliminable resin | Kind | — | PVP | PVP | PVP | PVP | PMMA copolymer | — | — |
|  | Molecular weight | ×10,000 | 4.0 | 4.0 | 36.0 | 4.0 | — | — | — |
|  | Concentration | wt % | 13.0 | 11.5 | 11.5 | 13.0 | 9.9 | 0 | 0.0 |
| Solvent | Kind | — | DMSO | DMSO | DMSO | DMSO | DMF | methanol | DMSO |
|  | Concentration | wt % | 74.0 | 77.0 | 77.0 | 74.0 | 75.2 | 72.5 | 74.0 |
| State of solution |  | — | transparent, even | transparent, even | transparent, even | transparent, even | transparent, phase separation | transparent, even | transparent, even |
| Average porosity |  | % | 40 | 45 | 43 | 39 | — | — | — |
| Pore diameter distribution | peak 1 | nm | 50 | 70 | 60 | 50 | — | — | — |
|  | peak 2 | nm | 200 | 250 | 230 | 200 | — | — | — |
| Structural period of continuous porous structure |  | μm | 0.10 | 0.12 | 0.11 | 0.09 | — | — | — |
| Thickness of skin layer |  | μm | 5 | 7 | 6 | 5 | indistinct | indistinct | indistinct |
| Structural period of core layer |  | μm | 0.300 | 0.330 | 0.310 | 0.290 | — | — | — |
| Continuous porous structure |  | present/ absent | present | present | present | present | absent | absent | absent |

|  |  | Unit | Ex. 5 | Ex. 6 | Ex. 7 | Ex. 8 | Ex. 9 | Ex. 10 |
|---|---|---|---|---|---|---|---|---|
| Carbonizable resin | Kind | — | PAN | PAN | PAN | PAN | PAN | PAN |
|  | Molecular weight | ×10,000 | 15.0 | 15.0 | 15.0 | 15.0 | 15.0 | 15.0 |
|  | Concentration | wt % | 13.0 | 13.0 | 13.0 | 13.0 | 7.5 | 7.5 |
| Eliminable resin | Kind | — | P(VP7/VAC3) | PS94AA6 | PVP | PVP | PVP | PVP |
|  | Molecular weight | ×10,000 | 1.3 | 0.3 | 4.0 | 4.0 | 36.0 | 36.0 |
|  | Concentration | wt % | 13.0 | 13.0 | 13.0 | 13.0 | 7.5 | 7.5 |
| Solvent | Kind | — | DMSO | DMSO | DMSO | DMSO | DMSO | DMSO |
|  | Concentration | wt % | 74.0 | 74.0 | 74.0 | 74.0 | 85.0 | 85.0 |

TABLE 1-continued

| | | | | | | | | |
|---|---|---|---|---|---|---|---|---|
| State of solution | | — | — | trans-parent, even | trans-parent, even | trans-parent, even | trans-parent, even | trans-parent, even | trans-parent, even |
| Average porosity | | % | 40 | 52 | — | 42 | 44 | 43 |
| Pore diameter distribution | peak 1 | nm | 60 | 100 | — | 50 | 80 | 85 |
| | peak 2 | nm | 220 | 380 | — | 200 | 320 | 330 |
| Structural period of continuous porous structure | | μm | 0.13 | 0.32 | 0.10 | 0.11 | 0.22 | 0.23 |
| Thickness of skin layer | | μm | 7 | 6 | — | — | 6 | 6 |
| Structural period of core layer | | μm | 0.320 | 0.310 | — | — | 0.450 | 0.450 |
| Continuous porous structure | | present/absent | present | present | present | present | present | present |

DESCRIPTION OF REFERENCE NUMERALS AND SIGNS

1: Branches (carbon part)
2: Pores (voids)
3: Branches (carbonizable resin part)
4: Eliminable resin part (part which is to be voids)

The invention claimed is:

1. A porous carbon material which comprises a portion having a continuous porous structure having a structure in which branches and pores are respectively continued inward forming a core layer and a skin layer formed around the core layer, wherein the skin layer comprises a portion having substantially no continuous porous structure,
   wherein a central part of the continuous porous structure has a structural period of 0.002 to 1 μm,
   wherein the continuous porous structure has at least one peak diameter in a range of 2 to 400 nm in a pore diameter distribution curve thereof, and
   wherein the portion having substantially no continuous porous structure comprises no pores having a size greater than 1 nm over an area that is not less than a region of a square in which each side of the square corresponds to three times the structural period.

2. The porous carbon material according to claim 1, having an average porosity of 10 to 80%.

3. The porous carbon material according to claim 2, which is in a form of a fiber, film, or powder.

4. The porous carbon material according to claim 1, which is in a form of a fiber, film, or powder.

5. A process for producing the porous carbon material according to claim 1, the process comprising:
   step 1: a step in which 10 to 90% by weight of a carbonizable resin and 90 to 10% by weight of an eliminable resin are brought into a compatibly mixed state to obtain a resin mixture;
   step 2: a step in which the resin mixture obtained in the step 1 is caused to undergo phase separation and the separated phases are fixed to obtain a porous-carbon-material precursor; and
   step 3: a step in which the porous-carbon-material precursor obtained in the step 2 is carbonized by pyrolysis.

6. The process for producing a porous carbon material according to claim 5, wherein a product obtained by carbonizing the porous-carbon-material precursor by pyrolysis in the step 3 is further subjected to a pulverization treatment.

* * * * *